(12) United States Patent
Mau et al.

(10) Patent No.: US 7,450,221 B2
(45) Date of Patent: Nov. 11, 2008

(54) METHOD AND APPARATUS FOR DETECTING MOTION OF AN APPARATUS AND FOR CONTROLLING THE OPERATIONS OF THE APPARATUS IN ACCORDANCE WITH THE DETECTED MOTION

(75) Inventors: Ming Yong Mau, Penang (MY); Shamoon Shabudin, Penang (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 213 days.

(21) Appl. No.: 11/247,387

(22) Filed: Oct. 11, 2005

(65) Prior Publication Data

US 2007/0081143 A1    Apr. 12, 2007

(51) Int. Cl.
*G01P 3/40* (2006.01)
*H04B 1/00* (2006.01)

(52) U.S. Cl. .................. 356/23; 356/614; 375/130; 348/143; 348/154

(58) Field of Classification Search ............... None
See application file for complete search history.

(56) References Cited

U.S. PATENT DOCUMENTS 5,596,366 A * 1/1997 Takashima et al. ..... 348/208.16

* cited by examiner

*Primary Examiner*—Tarifur R Chowdhury
*Assistant Examiner*—Tara S Pajoohi (57) ABSTRACT

A motion detection apparatus and method for detecting motion in an apparatus being monitored, and for controlling operations of the apparatus being monitored. First logic of the apparatus processes electrical signals output from an optical detector to produce values that represent movement or an absence of movement of the apparatus being monitored. Second logic of the apparatus receives the values from the first logic and processes them to determine whether the values indicate that the apparatus being monitored has moved. When a determination is made that the apparatus being monitored has not moved, the apparatus being monitored is change from a current mode of operations to a different mode of operations.

18 Claims, 5 Drawing Sheets

METHOD AND APPARATUS FOR DETECTING MOTION OF AN APPARATUS AND FOR CONTROLLING THE OPERATIONS OF THE APPARATUS IN ACCORDANCE WITH THE DETECTED MOTION

BACKGROUND OF THE INVENTION

Various types of apparatuses have modes of operation that are associated with some type of motion, orientation or positioning of the system. For example, a clothing iron is typically oriented horizontally and moved in generally forward and reverse horizontal directions by a user when it is being used to iron an article of clothing. When the iron is not being used to iron clothing, it is typically placed in a tilted, substantially upright orientation on the ironing board. Some irons have a circuit that includes a switch that closes when the iron is placed in this orientation, causing a signal to be sent to a controller in the iron, which then turns off the iron.

A lawnmower is another type of apparatus that has a mode of operation that is associated with motion. The lawnmower is typically oriented horizontally and moved in generally the forward direction by a user when it is being used to cut grass. Some self-propelled lawnmowers include a "kill switch" that the user holds as the user guides the mower through the lawn. Releasing the kill switch turns off the lawnmower.

Although various technological advancements have been made in these and other types of apparatuses that cause them to be automatically turned off at particular times, these solutions typically rely on electromechanical switches and moving parts that may be unreliable and prone to malfunction. It would be desirable to provide a motion detection system that may be used with such apparatuses to control their operations based on the detection of motion or the absence of motion. It would also be desirable to provide such a motion detection system that does not rely on electromechanical switches or moving parts, and thus is more reliable and less prone to malfunction than current solutions.

SUMMARY OF THE INVENTION

The invention provides a motion detection apparatus and method for detecting motion in an apparatus being monitored, and for controlling operations of the apparatus being monitored. First logic of the apparatus processes electrical signals output from an optical detector to produce values that represent movement or an absence of movement of the apparatus being monitored. Second logic of the apparatus receives the values from the first logic and processes them to determine whether the values indicate that the apparatus being monitored has moved. When a determination is made that the apparatus being monitored has not moved, the apparatus being monitored is change from a current mode of operations to a different mode of operations.

In accordance with the method, light is projected from a light source onto a surface or object that is external to the apparatus being monitored. The light reflected from a surface or object external to the apparatus being monitored is received in an optical detector, which converts the reflected optical energy into electrical signal. The electrical signals are processed to produce values that represent movement or an absence of movement of the apparatus being monitored. These values are processed to determine whether the values indicate that the apparatus being monitored has moved. If a determination is made that the apparatus being monitored has not moved, one or more control signals are generated that cause the apparatus being monitored to change from a current mode of operations to a different mode of operations.

The different mode of operations may correspond to shutting down the apparatus being monitored such that it consumes no energy, or it may correspond to a "sleep" mode in which the amount of power consumed by the apparatus is reduced.

These and other features and advantages of the invention will become apparent from the following description, drawings and claims.

DETAILED DESCRIPTION OF AN EXEMPLARY EMBODIMENT

Figure 1:
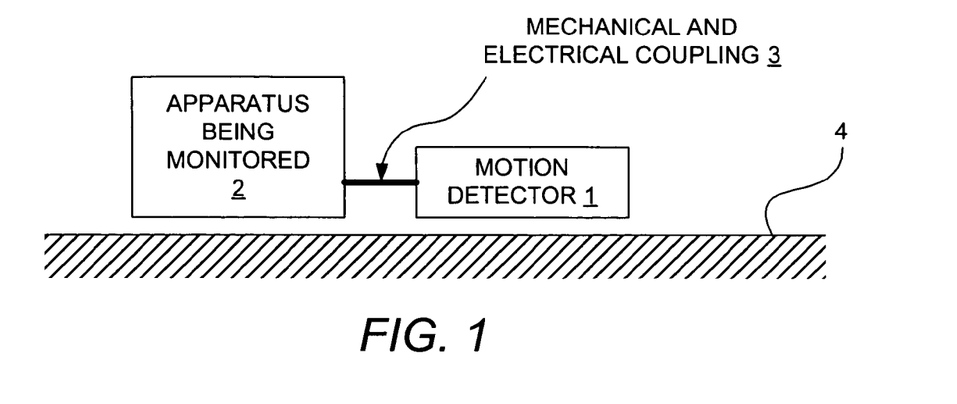
FIG. 1 illustrates a pictorial diagram of the motion detector of the invention mechanically and electrically coupled to an apparatus to be monitored to detect motion or the absence of motion of the apparatus.

FIG. 1 illustrates a pictorial diagram of the motion detector 1 of the invention mechanically and electrically coupled to an apparatus 2 to be monitored for motion. The mechanical and electrical coupling of the motion detector 1 with the apparatus 2 is represented by line 3. As the apparatus 2 and the connected motion detector 1 are moved over a surface 4, the motion detector 1 detects the motion and delivers electrical signals to the apparatus 2, which controls its mode of operations based on the electrical signals received from the motion detector 1. Although the motion detector 1 is shown as being separate from the apparatus 2, the motion detector 1 will typically be affixed to a surface (e.g., a bottom surface) of the apparatus 2 at a location adjacent the surface 4.

In accordance with the preferred embodiment, a controller in the apparatus 2, such as a microcontroller or microprocessor, receives the electrical signals from the motion detector 1 and causes the apparatus to take any one of three actions: (1) nothing, i.e., the apparatus continues to operate in the same mode with no changes in power level, (2) the apparatus switches to a sleep mode in which power consumption is reduced, or (3) the apparatus shuts down completely, in which case no power is consumed. The manner in which the controller of the apparatus 2 makes the determinations that result in one of these three actions being taken is described below with reference to FIGS. 3, 5 and 6.

In accordance with the preferred embodiment, the motion detector 1 uses optics and electronics and has no moving parts or electromechanical switches. The motion detector 1 projects light onto an external surface adjacent the outside of the apparatus 2 and receives light reflected from the surface back to the motion detector 1. The light reflected back is then converted by an optical-to-electrical converter, such as an array of photosensors, into electrical signals that are then processed by a processor of the motion detector 1. An embodiment of the processor of the motion detector 1 will be described below with reference to FIG. 4. The processor of the motion detector 1 then outputs electrical signals to the controller of the apparatus 2, which it then uses to determine which of the aforementioned three actions to take.

Figure 2:
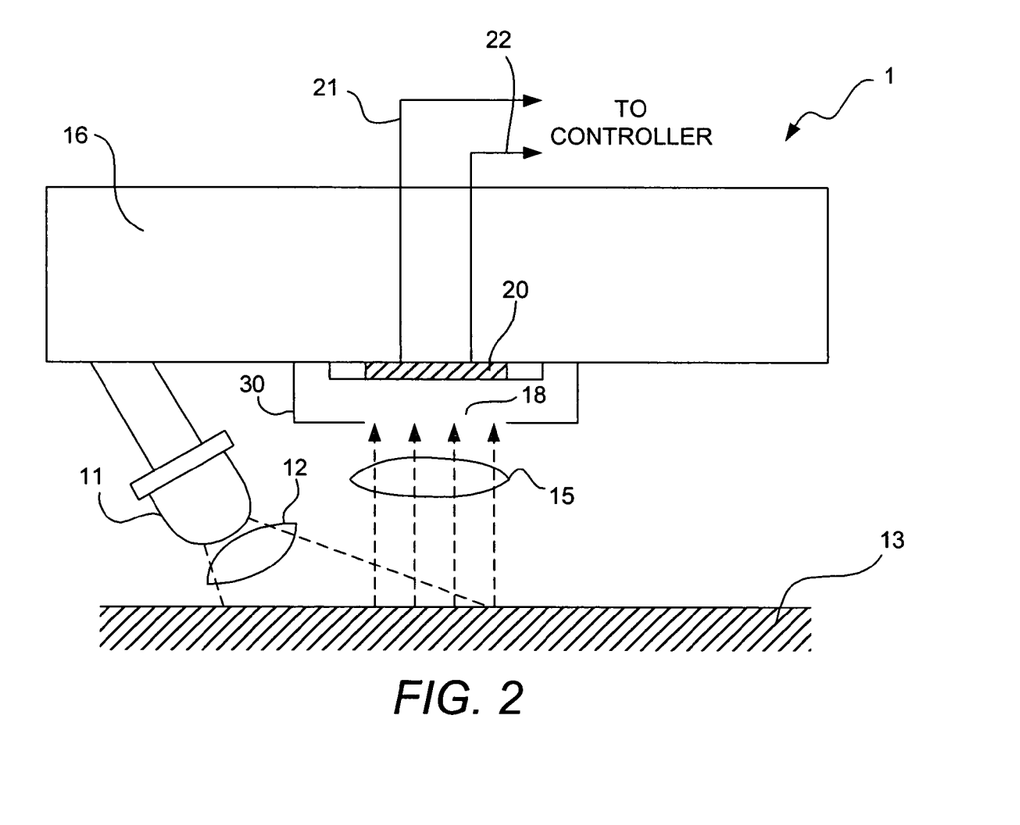
FIG. 2 illustrates a block diagram of the motion detection system of the invention in accordance With an embodiment.

FIG. 2 illustrates a block diagram of the electrical and optical components of the motion detector 1 of the invention in accordance with an exemplary embodiment. The motion detector 1 includes a light source 11, which is typically a light emitting diode (LED) or a laser diode, an optical lens 12 for focusing light produced by the light source 11 onto an external surface 13, an integrated circuit (IC) 20 that includes an array of photosensors (not shown), an optical lens 15 for focusing light reflected from the surface 13 onto the IC 20, and a printed circuit board (PCB) 16 for mounting these components. Any type of light source may be used. LEDs and laser diodes are merely examples of suitable light sources.

The package 30 of the IC 20 has an opening 18 formed in it through which light reflected from an external surface 13 enters the package 30 and impinges on the IC 14. The photosensor array of the IC 20 converts the light that impinges thereon into electrical signals, which circuitry of the IC 20 processes to obtain information relating to changes in the position of the motion detector 1 in two horizontal directions that are transverse to one another. These directions are referred to herein as the x and y directions, and the changes in these directions are referred to herein as $\Delta x$ and $\Delta y$. The IC 20 delivers the $\Delta x$ and $\Delta y$ values on lines 21 and 22 to the controller of the apparatus 2, as described below in detail with reference to FIG. 4.

Figure 3:
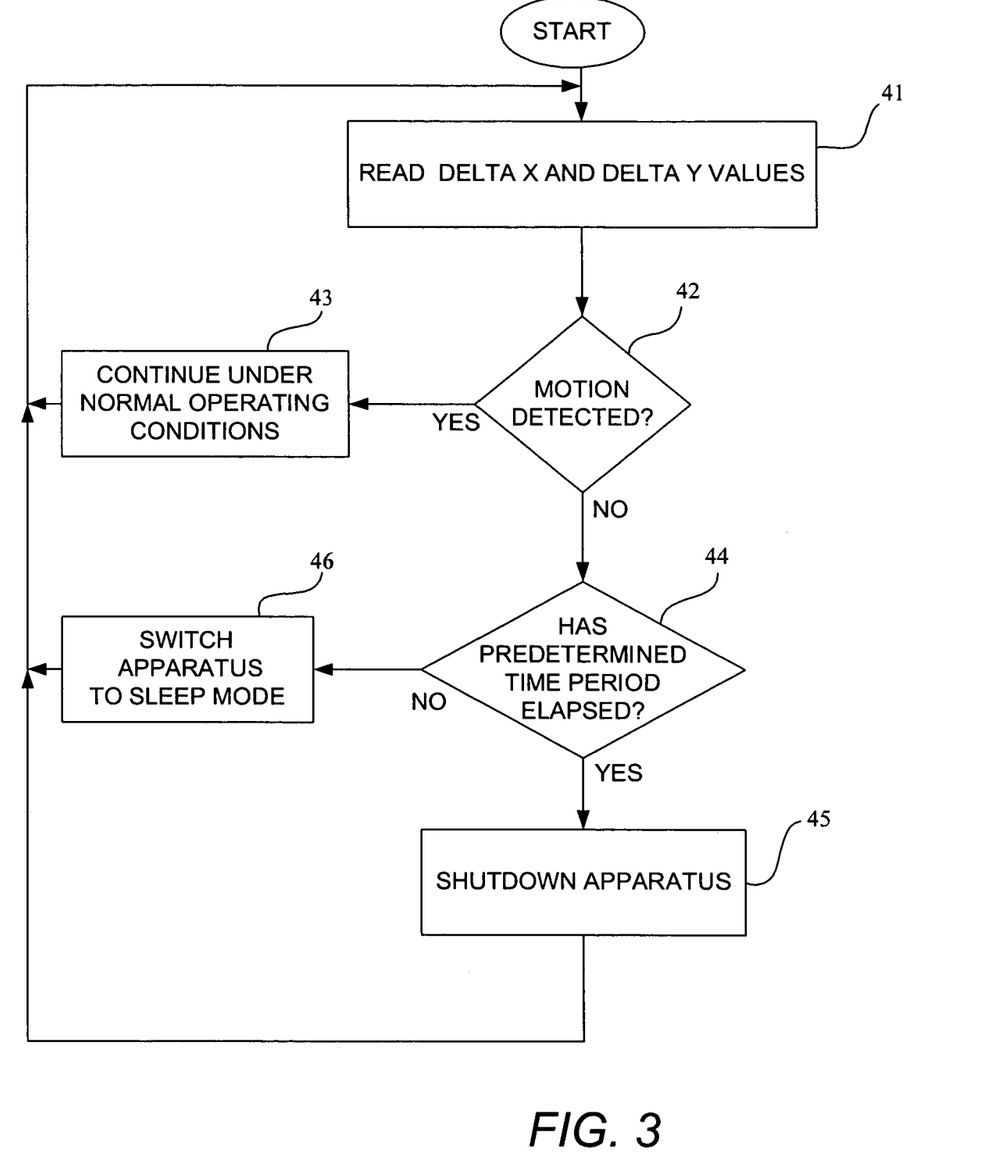
FIG. 3 illustrates a flowchart demonstrating the method of the invention in accordance with the preferred embodiment.

FIG. 3 illustrates a flowchart that represents the method of the invention in accordance with an exemplary embodiment. The $\Delta x$ and $\Delta y$ values generated by the IC 20 are used by the microcontroller to determine which of the above three actions to take. As described below with reference to FIG. 4, as these values are generated, they are stored in a register (not shown) in the IC 20. The microcontroller of the apparatus 2 reads and processes these values and takes the appropriate action. The flowcharts illustrated in FIGS. 3, 5 and 6 demonstrate different embodiments of the algorithm performed by the microcontroller of the apparatus 2 to accomplish this.

The first step in the process performed by the microcontroller is to read the $\Delta x$ and $\Delta y$ values stored in the IC registers, as indicated by block 41. The $\Delta x$ and $\Delta y$ values are then processed to determine whether a change in either the x or y direction has occurred, as indicated by block 42. If a change has occurred, indicating that the apparatus is in motion, then the state of the apparatus remains unchanged, as indicated by block 43. The process then returns to the step represented by block 41. If a change has not occurred, then a determination is made as to whether the amount of time since the last change occurred exceeds a predetermined threshold value, as indicated by block 44. If so, then the apparatus is shutdown completely, as indicated by block 45. The process then returns to block 41. If not, then the apparatus is switched to a "sleep" mode during which the power level is reduced to a level below that used during normal operations, as indicated by block 46.

Figure 4:
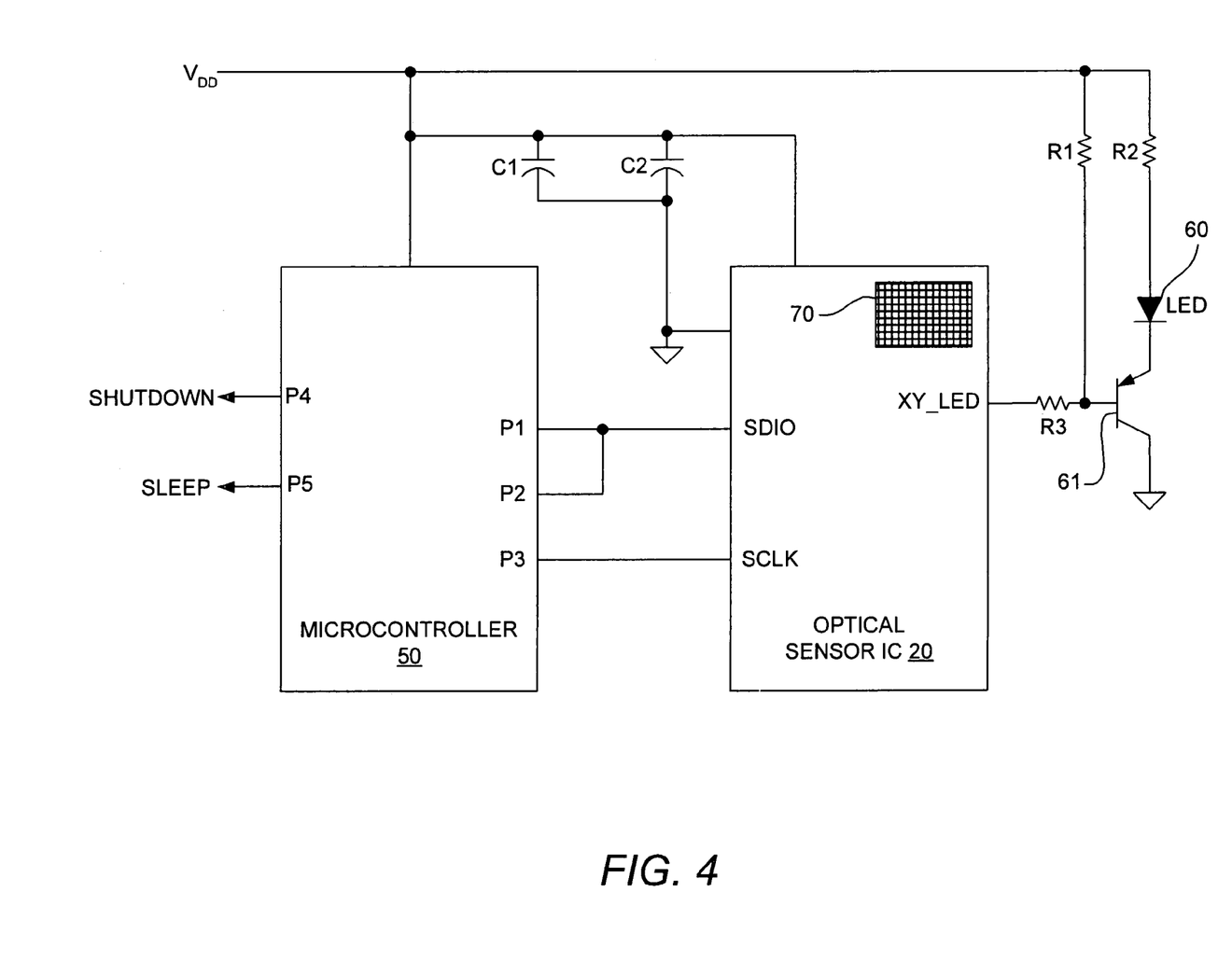
FIG. 4 illustrates a schematic diagram of the motion detection system of the invention in accordance with an exemplary embodiment.

FIG. 4 illustrates a schematic diagram of the optical sensor IC 20 of the motion detector 1 and the microcontroller 50 of the apparatus 2. The optical sensor IC 20 may be, for example, an Agilent ADNS-2610 optical sensor, which is typically used in optical mice. Examples of other optical sensors that are suitable for use with the invention are the Agilent ADNS-2620 and ADNS-3060 optical sensors. Of course, the invention is not limited to using any particular type of optical sensor.

When the signal output at the input/output (I/O) port labeled XY_LED is asserted, the transistor 61 is turned on, and current flows through the LED 60 to ground. In this state, the LED 60 emits light. The light emitted by the LED 60 that is reflected from the surface (not shown) adjacent the apparatus is focused by a lens (not shown) onto the photosensor array 70 of the optical sensor IC 20. The array 70 converts the optical energy into electrical signals. The electrical signals are converted by an analog-to-digital converter (not shown) of the optical sensor IC 20 into digital signals that are stored in one or more of the aforementioned registers (not shown) of the IC 20. The optical sensor IC 20 includes logic configured to process the digital signals read out from the registers into the aforementioned $\Delta x$ and $\Delta y$ motion values.

The capacitors C1 and C2 perform noise filtering on the supply voltage, $V_{DD}$, which is supplied to both the IC 20 and microcontroller 50. The resistors R1 and R3 provide proper biasing for the transistor 61. The resistor R2 provides the proper forward current for the LED 60. It should be noted that a variety of different circuit configurations may be used for these purposes and that the invention is not limited to any particular circuit configuration, as will be understood by those skilled in the art in view of this description.

The microcontroller 50 of the apparatus polls the optical sensor IC 20 for the $\Delta x$ and $\Delta y$ motion values. When the signals output from the microcontroller at I/O pins P1 and P2 are deasserted and asserted, respectively, the optical sensor IC 20 interprets this as an indication to read the $\Delta x$ and $\Delta y$ motion values from the registers and output them from the serial data I/O port (SDIO) of the optical sensor IC 20. The values are input to the microcontroller 50 at I/O pin P2. The microcontroller 50 provides a clock signal from I/O port P3 to the serial clock (SCLK) port of the optical sensor IC 20, which controls the timing of the serial transfer of the $\Delta x$ and $\Delta y$ motion values from IC 20 to microcontroller 50.

The microcontroller 50 is programmed with software to perform the algorithm described above with reference to FIG. 3. The microcontroller 50 processes the motion values and, based on those values, determines whether to continue operating in the current manner, whether to switch to the sleep mode, or whether to shutdown. When the microcontroller 50 determines that the proper course of action is to switch to the sleep mode, a signal is asserted at I/O pin P5, which is delivered to circuitry (not shown) of the apparatus that causes the apparatus to switch to the sleep mode. When the microcontroller 50 determines that the proper course of action is to shutdown, a signal is asserted at I/O pin P4, which is delivered to circuitry (not shown) of the apparatus that causes the apparatus to shutdown. The microcontroller 50 will typically include a counter (not shown) to enable the decision process represented by block 44 in FIG. 3 to be performed.

It should be noted that although the optical sensor IC 20 and the microcontroller 50 are separate ICs, the functions performed by them could be accomplished by a single IC. For example, the microcontroller 50 could be configured with logic that enables it to perform the functions described above with reference to FIG. 3, and, in addition, to perform the functions described above as being performed by the optical sensor IC 20. Alternatively, the optical sensor IC 20 could perform the functions described above as being performed by the optical sensor IC 20, and, in addition, to perform the functions described above with reference to FIG. 3 and any other functions that are normally performed by the microcontroller 50.

Figure 5:
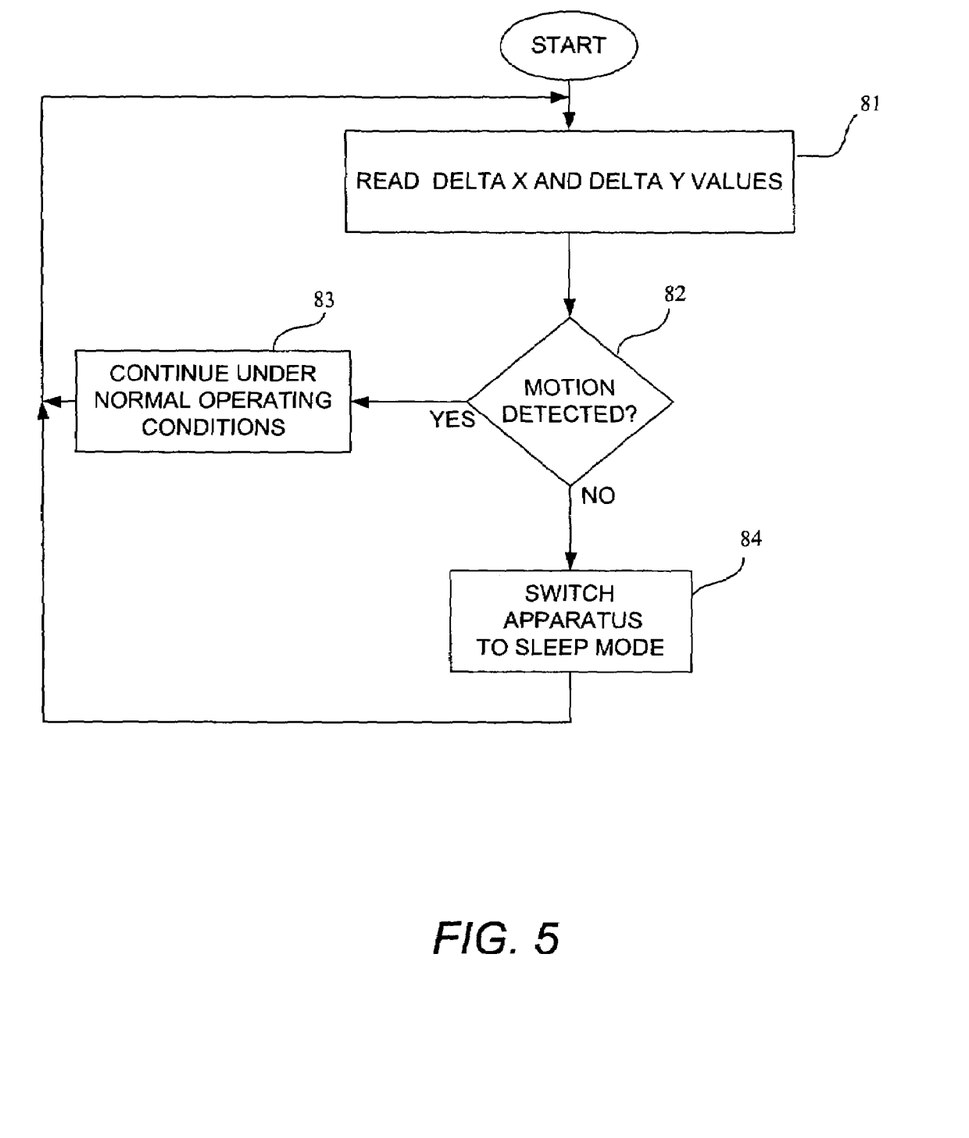
FIG. 5 illustrates a flowchart demonstrating the method of the invention in accordance with another embodiment.
Figure 6:
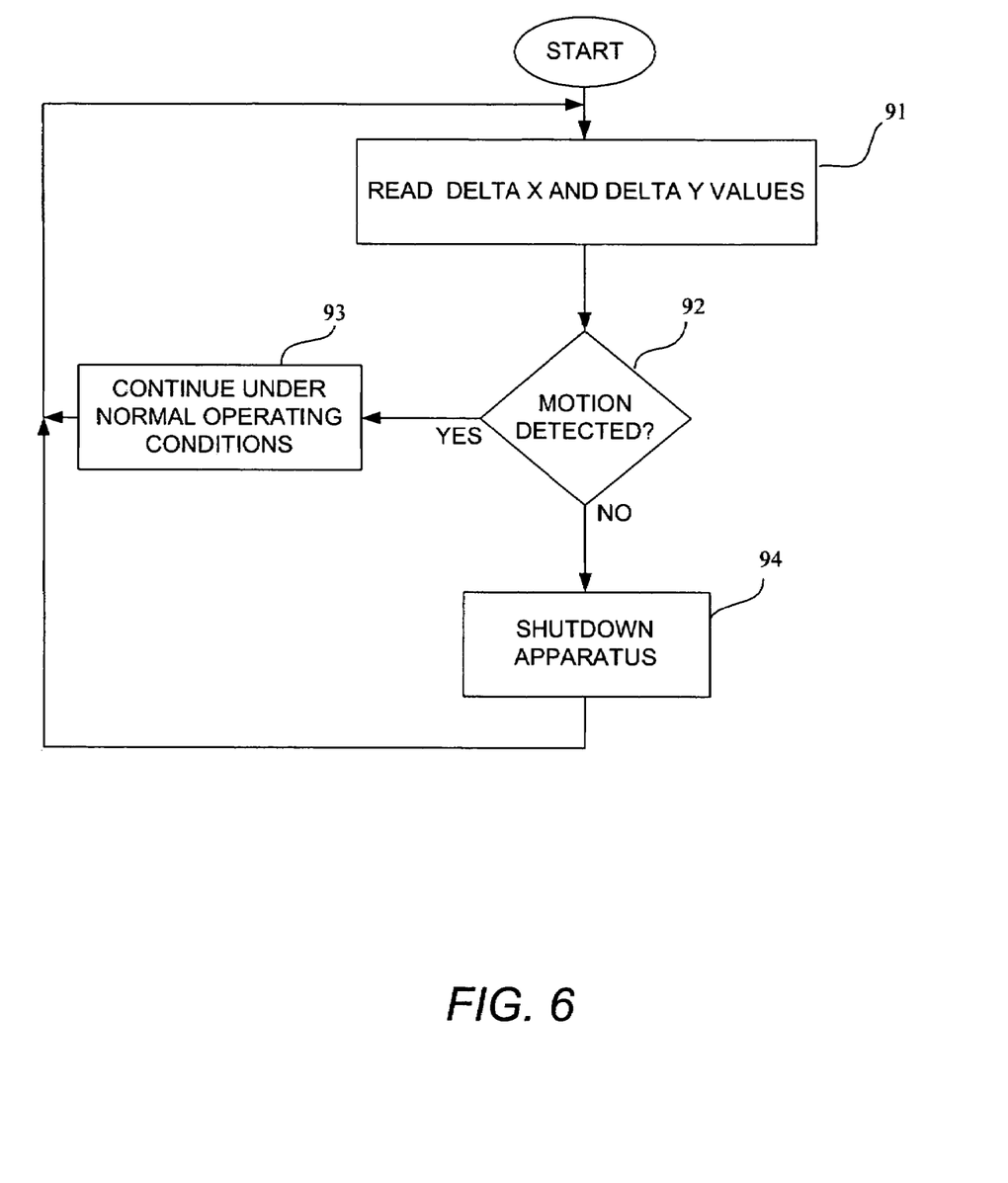
FIG. 6 illustrates a flowchart demonstrating the method of the invention in accordance with another embodiment.

The algorithm described above with reference to FIG. 3 may be simplified if desired into the algorithms represented by the flowcharts shown in FIGS. 5 and 6. Blocks 81, 82 and 83 shown in FIG. 5 are identical to blocks 41, 42 and 43, respectively, shown in FIG. 3. If at any given time, a determination is made at block 82 that no motion is detected, the apparatus switches to the sleep mode, as indicated by block 84. The process then returns to block 81. Thus, as long as the apparatus is powered on, the loop represented by blocks 81-84 will continue to be performed.

The algorithm represented by the flowchart shown in FIG. 5 may be further modified such that the decision at block 82 is a decision as to whether no motion has been detected for a particular period of time. In that case, only when no motion has been detected for the period of time will the apparatus switch to the sleep mode. Otherwise, the apparatus will continue to operate in the normal manner.

Blocks 91, 92 and 93 shown in FIG. 6 are identical to blocks 41, 42 and 43, respectively, shown in FIG. 3. If at any given time, a determination is made at block 92 that no motion is detected, the apparatus shutsdown, as indicated by block 94. The process then returns to block 91. This algorithm may be further modified such that the decision at block 92 is a decision as to whether no motion has been detected for a particular period of time. In that case, only when no motion has been detected for the period of time will the apparatus shutdown. Otherwise, the apparatus will continue to operate in the normal manner.

The apparatus being monitored may be any type of apparatus, device or appliance that performs some task that involves the apparatus being in motion intermittently. Examples of apparatuses that are moved during operation with which the invention may be advantageously employed include clothing irons, lawnmowers, lawn tools, carpentry tools, vacuum cleaners, etc. Those skilled in the art will understand, in view of the description provided herein, how the invention may be employed with these and other apparatuses or appliances.

It should be noted that the invention has been described with reference to exemplary embodiments and that the invention is not limited to these embodiments. Modifications may be made to the embodiments described herein and all such modifications are within the scope of the invention.

What is claimed is:

1. A motion detection apparatus for detecting motion in an apparatus being monitored, and for controlling operations of the apparatus being monitored, the motion detection apparatus comprising:
    a light source;
    an optical detector that converts optical energy into electrical signals in response to incident light reflected from a surface external to the apparatus being monitored;
    first logic configured to process the electrical signals output from the optical detector to produce values that represent movement or an absence of movement of the apparatus being monitored; and
    second logic that receives the values from the first logic, the second logic being configured to process the received values to determine whether the values indicate that the apparatus being monitored has moved, and to produce one or more control signals based on the determination, wherein when a determination is made that the apparatus being monitored has not moved, said one or more control signals cause the apparatus being monitored to change from a current mode of operations to a different mode of operations.

2. The motion detection apparatus of claim 1, wherein the first logic is logic in an optical sensor integrated circuit (IC) and wherein the second logic is logic in a microcontroller IC of the apparatus being monitored, the microcontroller IC controlling operations of the apparatus being monitored, the microcontroller IC being in communication with the optical sensor IC for receiving said values from the optical sensor IC, the optical sensor IC comprising the optical detector.

3. The motion detection apparatus of claim 1, wherein the first and second logic are embedded in a single integrated circuit (IC).

4. The motion detection apparatus of claim 1, wherein said different mode of operations corresponds to a power reduction mode in which the apparatus being monitored is on and an amount of electrical power being used by the apparatus being monitored is reduced relative to an amount of electrical power that is used by the apparatus being monitored prior to switching from said current mode to the power reduction mode.

5. The motion detection apparatus of claim 1, wherein said different mode of operations corresponds to a shutdown mode in which the apparatus being monitored is turned off such that no electrical power is used by the apparatus being monitored.

6. A motion detection apparatus for detecting motion in an apparatus being monitored, and for controlling operations of the apparatus being monitored, the motion detection apparatus comprising:
    a light source;
    an optical detector that converts optical energy into electrical signals in response to incident light reflected from a surface external to the apparatus being monitored;
    first logic configured to process the electrical signals output from the optical detector to produce values that represent movement or an absence of movement of the apparatus being monitored; and
    second logic that receives the values from the first logic, the second logic being configured to process the received values to determine whether the values indicate that the apparatus being monitored has moved, and to produce one or more control signals based on the determination, wherein when a determination is made that the apparatus being monitored has not moved, a determination is made as to an amount of time that has elapsed since a previous determination was made by the second logic that the apparatus being monitored has not moved, wherein if a determination is made that the amount of time that has elapsed since a previous determination was made by the second logic that the apparatus being monitored has not moved exceeds a predetermined time period, said one or more control signals cause the apparatus being monitored to be turned off, and wherein if a determination is made that the amount of time that has elapsed since a previous determination was made by the second logic that the apparatus being monitored has not moved does not exceed a predetermined time period, said one or more control signals cause the apparatus being monitored to be switched from a current mode of operations to a power reduction mode in which the apparatus being monitored is on and an amount of electrical power being used by the apparatus being monitored is reduced relative to an amount of electrical power that is used by the apparatus being monitored prior to switching from said current mode to the power reduction mode.

7. The motion detection apparatus of claim 6, wherein the first logic is logic in an optical sensor integrated circuit (IC) and wherein the second logic is logic in a microcontroller IC of the apparatus being monitored, the microcontroller IC controlling operations of the apparatus being monitored, the microcontroller IC being in communication with the optical sensor IC for receiving said values from the optical sensor IC, the optical sensor IC comprising the optical detector.

8. The motion detection apparatus of claim 6, wherein the first and second logic are embedded in a single integrated circuit (IC).

9. A method for detecting motion in an apparatus being monitored, and for controlling operations of the apparatus being monitored, the method comprising:
　projecting light from a light source onto a surface or object that is external to the apparatus;
　receiving light reflected from the surface or object in an optical detector;
　in the optical detector, converting the reflected optical energy into electrical signals;
　processing the electrical signals produced by the optical detector to produce values that represent movement or an absence of movement of the apparatus being monitored;
　processing the values to determine whether the values indicate that the apparatus being monitored has moved; and
　if a determination is made that the apparatus being monitored has not moved, generating one or more control signals that cause the apparatus being monitored to change from a current mode of operations to a different mode of operations.

10. The method of claim 9, wherein the processing of the electrical signals to produce said values is performed in logic in an optical sensor integrated circuit (IC) and wherein the processing of the values is performed in logic in a microcontroller IC of the apparatus being monitored, the microcontroller IC controlling operations of the apparatus being monitored, the microcontroller IC being in communication with the optical sensor IC for receiving said values from the optical sensor IC, the optical sensor IC comprising the optical detector.

11. The method of claim 9, wherein said different mode of operations corresponds to a power reduction mode in which the apparatus being monitored is on and an amount of electrical power being used by the apparatus being monitored is reduced relative to an amount of electrical power that is used by the apparatus being monitored prior to switching from said current mode to the power reduction mode.

12. The method of claim 9, wherein said different mode of operations corresponds to a shutdown mode in which the apparatus being monitored is turned off such that no electrical power is used by the apparatus being monitored.

13. A method for detecting motion in an apparatus being monitored, and for controlling operations of the apparatus being monitored, the method comprising:
　projecting light from a light source onto a surface or object that is external to the apparatus;
　receiving light reflected from the surface or object in an optical detector;
　in the optical detector, convening the reflected optical energy into electrical signals;
　processing the electrical signals produced by the optical detector to produce values that represent movement or an absence of movement of the apparatus being monitored;
　processing the values to determine whether the values indicate that the apparatus being monitored has moved;
　if a determination is made that the apparatus being monitored has not moved, determining an amount of time that has elapsed since a previous determination was made that the apparatus being monitored has not moved;
　if a determination is made that the amount of time that has elapsed since a previous determination was made that the apparatus being monitored has not moved exceeds a predetermined time period, causing the apparatus being monitored to be turned off; and
　if a determination is made that the amount of time that has elapsed since a previous determination was made that the apparatus being monitored has not moved does not exceed a predetermined time period, causing the apparatus being monitored to be switched from a current mode of operations to a power-reduction mode in which in which an amount of electrical power being used by the apparatus being monitored is reduced relative to an amount of electrical power that is used by the apparatus being monitored prior to switching from said current mode to the power reduction mode.

14. The method of claim 13, wherein the processing of the electrical signals to produce said values is performed in logic in an optical sensor integrated circuit (IC) and wherein the processing of the values is performed in logic in a microcontroller IC of the apparatus being monitored, the microcontroller IC controlling operations of the apparatus being monitored, the microcontroller IC being in communication with the optical sensor IC for receiving said values from the optical sensor IC, the optical sensor IC comprising the optical detector.

15. The method of claim 13, wherein said different mode of operations corresponds to a power reduction mode in which the apparatus being monitored is on and an amount of electrical power being used by the apparatus being monitored is reduced relative to an amount of electrical power that is used by the apparatus being monitored prior to switching from said current mode to the power reduction mode.

16. A computer program for controlling operations of an apparatus being monitored based on detecting motion or detecting an absence of motion in the apparatus being monitored, the program being embodied on a computer-readable medium including logic encoded thereon that when executed in the apparatus is adapted to perform a method, the computer readable medium comprising:
　code for processing electrical signals produced by an optical detector in response to light impinging on the optical detector to produce values that represent movement or an absence of movement of the apparatus being monitored, the light impinging on the optical detector being light reflected from a surface external to the apparatus being monitored;
　code for processing said values to determine whether the values indicate that the apparatus being monitored has moved; and
　code for generating one or more control signals that cause the apparatus being monitored to change from a current mode of operations to a different mode of operations if a determination is made that the apparatus being monitored has not moved.

17. The program of claim 16, wherein said different mode of operations corresponds to a power reduction mode in which the apparatus being monitored is on and an amount of electrical power being used by the apparatus being monitored is reduced relative to an amount of electrical power that is used by the apparatus being monitored prior to switching from said current mode to the power reduction mode.

18. The program of claim 16, wherein said different mode of operations corresponds to a shutdown mode in which the apparatus being monitored is turned off such that no electrical power is used by the apparatus being monitored.

\* \* \* \* \*

UNITED STATES PATENT AND TRADEMARK OFFICE
CERTIFICATE OF CORRECTION

PATENT NO. : 7,450,221 B2
APPLICATION NO. : 11/247387
DATED : November 11, 2008
INVENTOR(S) : Ming Yong Mau et al.

It is certified that error appears in the above-identified patent and that said Letters Patent is hereby corrected as shown below:

Column 7, Line 52, (Approx.), Claim 13, delete "convening" and insert -- converting --;

Column 8, Line 10, Claim 13, before "an amount" delete "in which".

Signed and Sealed this

Second Day of November, 2010

David J. Kappos
*Director of the United States Patent and Trademark Office*